Sept. 20, 1932.  J. G. ZOLLEIS  1,878,569
HANDLE FOR VALVES AND THE LIKE
Filed March 28, 1932
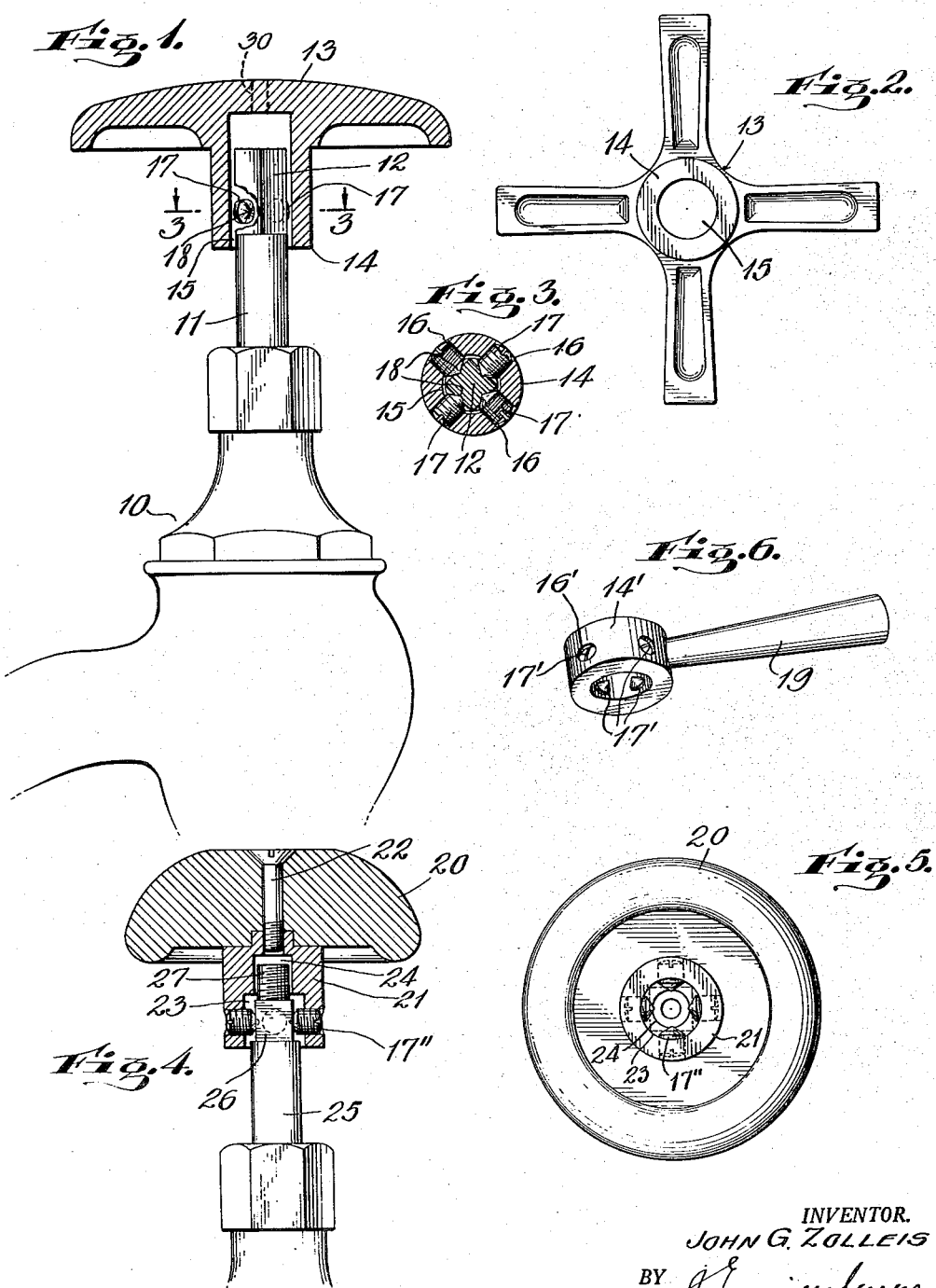
INVENTOR.
JOHN G. ZOLLEIS
BY
ATTORNEY Patented Sept. 20, 1932

1,878,569

UNITED STATES PATENT OFFICE

JOHN G. ZOLLEIS, OF PHILADELPHIA, PENNSYLVANIA

HANDLE FOR VALVES AND THE LIKE

Application filed March 28, 1932. Serial No. 601,632.

My invention relates to handles for valves and the like, and particularly to means for adapting and connecting a handle to various types of valve stems.

In both the plumbing and steam fitting manufacturing industries, it has been quite customary for each manufacturer to make the stems for valves of various types distinctive, that is, each manufacturer aimed to secure for himself all of the repair and replacement business for his line of goods by making his particular valve stems of a particular design or construction and/or making the handles and the connection between the handles and valve stems of a particular type so that other handles would not fit his stems. Consequently, if the manufacturer subsequently changed the design of certain stems and discontinued the manufacture of such stems and handles to fit them, or as is quite prevalent to-day, has gone out of business, when a repair or replacement handle is needed, it is extremely difficult and quite often impossible to obtain a handle to fit the stem which was installed and which needs the replacement handle. This difficulty is quite usual in the case of porcelain or china handles which are subject to breakage. In the majority of cases, the cost of producing a single or a few handles to fit stems made by manufacturers who have discontinued the line or have gone out of business is prohibitive, and even if the customer is willing to pay the cost of a specially constructed handle, there is great delay in obtaining the same, due to the fact that special tools, dyes, etc., must be made in order to produce the handle.

In a great many cases, where the plumber cannot locate a handle to fit the stem, it is therefore necessary to remove the entire valve and replace it with a new one, and where the valves are in pairs, as for hot and cold water, it is desirable and necessary to install two new valves for the sake of appearance. In cases where the valves are installed in concealed fixtures, as in shower bath fixtures, which are placed in the wall, the inability to fit a handle to a stem necessitates the removing of the tile wall in order to replace the concealed bath or shower valve.

At the present time there is also a great trend to replace china or porcelain handles with chrome plated or other up to date handles of attractive appearance and durable qualities in order to modernize bathrooms. Under the conditions mentioned above, this necessitates, in most cases, the replacement entirely of every valve in the bathroom.

Aside from handles for the plumbing fixtures and the usual radiator valve handles, there are handles for steam valves interposed in a line through which live steam at a very high temperature passes, and which handles become so hot that when touched or grasped they burn the hand of the operator. Manufacturers of these handles have tried for years to avoid this objection by providing, usually, a wheel handle made of very light malleable cast iron provided with a great many perforations, the idea being that the light casting and the perforations would economically provide a handle which would not become heated to a high degree because of the circulation of air through the perforations. However, though the economy in production was accomplished by such handle, the reduction in the temperature as transmitted to the handle from the live steam pipe was not sufficiently reduced to permit grasping of the handle without discomfort and injury by burns, and this is especially true in connection with the smaller size valve handles. Then too, by making the malleable iron casting lighter, the manufacturers also made it more fragile so that they more readily break.

The principal object of my invention is to overcome the foregoing objections and difficulties by the provision of a standard type of handle of simple construction and provided with means enabling it to be readily adapted and connected to all types of existing valve stems, whereby the supply house will have to carry in stock only a fraction of the number of handles now carried and whereby replacement of lost or broken handles may be readily, quickly, and economically made by the plumber without disturbing the valve installation regardless of its character.

The foregoing object is accomplished by my invention regardless of the size or type of the valve stem, that is, whether it be a square headed stem tapped through the square on the side to receive a set screw that fits through the shank of the handle, or a square headed stem with its shank threaded above the squared portion to receive threads on the handle, or the broach stem, that is, a stem with a rounded end having longitudinal groups at its end, or stems having the ends partly round and partly flat, or any other type of stem, as will become hereinafter apparent.

Another object of my invention is to provide a handle for live steam valves embodying a substantially strong construction and adapted to fit various sized stems, and so constructed and arranged that there is a minimum area of contact between parts of the handle and the stem with ample provision for circulation of air space therebetween, whereby the temperature of the handle will be greatly less than the temperature of the steam line and valve stem, so that the handle may be grasped for operating the valve without discomfort or injury to the operator.

In the accompanying drawing wherein are shown preferred illustrative embodiments of the invention.

Fig. 1 is a fragmentary elevation of a valve casing and stem with a handle embodying my invention applied thereto, the handle being shown in vertical central section;

Fig. 2 is a bottom plan view of the handle shown in Fig. 1;

Fig. 3 is a sectional view on the line 3—3 of Fig. 1.

Fig. 4 is a view similar to Fig. 1 showing a type of radiator valve stem and handle embodying my invention applied thereto;

Fig. 5 is a bottom plan view of the handle shown in Fig. 4; and

Fig. 6 is a perspective view of a lever type of handle embodying my invention.

Referring in detail to Figs. 1–3, the numeral 10 designates the escutcheon or valve casing of a valve used on water spigots, 11 is the shank of the valve stem which projects outwardly beyond the top of the escutcheon or casing, and 12 is the squared upper end of a typical valve stem. Such stem when produced originally was designed to receive a handle having a squared socket of cross-sectional area to snugly fit on the squared end 12 of the stem so that the stem and handle would rotate together, and of course a set screw would engage through the wall of the handle socket and into the stem to hold the handle on the stem against removal axially of the stem.

According to the embodiment of my invention shown in Figs. 1–3, I provide a handle 13, illustrated as the 4-arm type, which has a socket 14 depending therefrom with the bore 15 made large enough to accommodate the largest sized valve stem now or heretofore in use. The bore 15 is also preferably round and extends up into the center of the 4-arm portion of the handle, while the wall of the socket 14 is of appreciable length and thickness. Special attention is called to these features of the socket 14, because it is provided with a plurality of screw threaded openings 16, preferably four in number, and arranged in intersecting planes, to receive screws 17, each preferably slightly longer or of a length substantially equal to the thickness of the wall of the socket 14 and each provided with a pointed end 18. As it is quite usual to make the valve stems of relatively soft non-rustable metal such as brass or copper or alloys thereof, the screws 18 are preferably of case hardened steel so that when the handle is positioned on the end of the valve stem as shown in Fig. 1, the screws can be tightened or screwed inwardly until the points 18 are embedded in the stem whether on the squared end portion or on the rounded shank portion 11. Obviously, the tightening of the screws will substantially center the stem and tubular portion of the handle relative to each other and lock them against relative rotation. By making the bore 15 of appreciable length it is possible to adjust the handle longitudinally of the stem when applying the handle.

Assuming that the stem 11 is already installed in a valve and the original handle therefor has been lost, stolen, or broken, and that the manufacturer has discontinued making this stem and handle or has gone out of business it is likely that a new handle cannot be had. It is necessary for the plumber, when called for such a repair job to go to the place where the valve is installed and endeavor to identify the manufacturer of the valve which he is often unable to do because there is no identification mark on the valve. Failing to identify the manufacturer, the plumber then applies to the supply house seeking through catalogs to identify the manufacturer. It is not unusual for plumbers to visit five or six supply houses without obtaining the information they seek. Assuming that the plumber was even able to secure the old broken handle, having no name thereon, he would present it to the supply house and that house in turn would send it to some manufacturer, who they think might be able to supply the handle. Meantime, under either of the above circumstances, the owner is without a valve handle and may be operating the valve by plyers which will chew into the soft metal of the stem, bend, and sometimes break it.

It will thus be seen that eventually the owner will have to have a complete new valve or pair of valves installed unless the plumber is fortunate in finding an old handle to fit, or a handle to fit is specially made at considerable expense and with much delay.

In actual practice, where handles embodying my invention were available and a plumber was called to make a handle repair or replacement job, all that he had to do upon applying to the supply house was to return to the job with a handle constructed in accordance with my invention and apply the same as shown in Fig. 1, and tighten the screws until the points were embedded in the stem. It made no difference that the end of the stem had been marred or chewed by plyers or even that the end of the stem had been bent or broken, because the plumber could still apply the handle to the remaining portion and this is accomplished without loss of time to the plumber, to the customer, or to the supply house, and with great economy to the customer and the supply house, as the former did not have to pay for a totally new complete valve installation and the latter did not have to carry a large stock of all types of handles for various valve stems. Furthermore, a handle did not have to be made specially.

I prefer and find that the best results are obtained when at least four screws 17 are arranged in the manner shown, and when the wall of the socket 14 is relatively thick, so that the outer ends of the screws will not project beyond the outer circumference of the socket regardless of the size of valve stem to which the socket is applied. Of course, it will be understood that where the stem is relatively small the screws will be screwed in further than where the stem is of the maximum diameter which the socket is calculated to fit.

The construction shown in Fig. 6 is the same as that shown in Figs. 1–3 except that instead of having the 4-arm handle I have the lever type of handle with a single arm 19 provided with a socket 14' and the screw openings 16' and screws 17' arranged similarly to the openings 16 and screws 17 in Fig. 3. The socket 14' is shown as being relatively short but as having a thick wall. Of course the socket 14' can be elongated as shown in Fig. 1 if desired. The device shown in Fig. 6 is applied and used in exactly the same manner as described in connection with the handle shown in Fig. 1.

Referring to Figs. 4 and 5, there is shown a radiator valve composition wheel or disc handle 20 to which the metallic socket 21 is attached by means of the screw 22 which engages axially through the handle 20 and into the upper end of the socket 21. The bore of the socket 21 is shown as relatively large at 23 and thereabove as reduced at 24. This is to accommodate the radiator valve stems of the type shown comprising the rounded shank 25 having a squared portion 26 and thereabove a threaded end 27. The handles originally applied to this type of stem had a squared socket to engage the squared portion 26 and the threaded end 27 extended through the handle to receive a washer and nut. When such handle was broken, it was practically impossible to replace it prior to my invention because the manufacturers had gone out of business or discontinued the type, and if there were any manufacturers of such handles still operating, or such handles available, they were extremely difficult to locate. However, with a handle shown in Figs. 4 and 5 embodying my invention, it is simply necessary to place the socket over the end of the stem so that the threaded end 27 will be disposed in the reduced bore 24 and the squared portion 26 will be disposed in the larger bore 23, which is of a diameter calculated to receive the largest diameter of radiator valve stems made. The screws 17" are then tightened until their pointed ends embed in the valve stem, whereby the handle and stem will rotate together when the handle is turned.

It makes no difference if the threaded end 27 has been destroyed or broken or even if the squared end has been damaged or broken, because the handle can still be placed over the rounded portion 25 and the screws tightened until their pointed ends embed therein.

So far as I am aware, I am the first person to have presented a handle fulfilling the universal demand and need for a handle that would fit all stems, enabling quick and economical replacement either for repair or modernizing purposes, and the valve stems illustrated in connection with my handles are only illustrative of two types in use, others of which have been mentioned hereinbefore for the purposes of illustration.

I would have it understood that the handle illustrated when applied in the manner shown and described, provides a lasting operative fit and although the handle may be used for emergency purposes, it is the purpose of this application to cover all uses to which the handle may be adapted whether for emergency or permanent installation for repair or modernization.

The length of the sockets and depth of the bore may be varied, as may also the thickness of the walls of the socket, but it is important to calculate the outside diameter of the socket, and the thickness of this wall, and the length of the screws, so that when the screws are tightened to embed in the metal stem of largest diameter that the outer ends will be countersunk or disposed within the openings in the socket. This is essential only to the attractive appearance and avoidance of injury by scratches or cuts inflicted by the ends of the screws should they project.

It has been pointed out herein, that it is an object of this invention to provide a handle for the stems of valves interposed in live steam lines, whereby the stem will not communicate to the handle a great amount of heat, and the handle being so constructed and connected to the stem that there is ample space for circulation of air to maintain the handle at such a temperature that it may be readily grasped and operated without burning the hand, regardless of the temperature of the valve stem. This is accomplished under the invention as hereinbefore explained, because as noted in the drawing, there is a space between the stem and the tubular portion of the handle into which the stem fits.

Referring to Fig. 1, it will be noted that I have indicated in dotted lines at 30, an opening through the top of the valve handle coaxial with the bore, so that air can circulate through the bore between the valve stem and the tubular portion of the handle and around the connecting screws. Then too, the only contact between the valve stem and the handle for direct transmission of heat is the point contact of the screws, which is relatively small, and the circulation of air through the bore and opening 30 and around the screws reduces the temperature at the connecting point. By making the handle of the ordinary wheel type with a plurality of openings, I can obtain a further circulation of air and reduction of metal in the handle and further reduce the temperature in the handle where it is gripped. I also wish to point out that the tubular member 14 can be made of larger diameter to further space it from the valve stem on live steam valves than on other valves to obtain a greater cooling space.

I have found that in accordance with the above, I can make metal steam valve wheel type handles of all sizes designed in thickness to avoid breakage and greatly reducing the transmission of heat to the handle, and hence materially reducing the temperature of the handle relative to the stem. Even if the tubular member of the handle becomes hot the temperature will not be as great with the four point contact connection as with the surface contact connection heretofore employed, and with the wheel portion, which is the part grasped to operate the valve, provided with a plurality of apertures, the temperature thereof relative to the tubular member is reduced to a degree enabling grasping and operation of the handle without burning the operator's hand.

I claim:

1. A handle adapted for use in association with valve stems of different sizes, said handle having a hand grasping portion and a tubular portion provided with an over-sized bore adapted to fit over the end of anyone of said valve stems, and a plurality of screws mounted in circumferentially spaced threaded openings in the wall of the said tubular portion, said screws being adapted to engage the valve stem within the tubular portion and being so positioned relative to each other that upon tightening they will substantially center the tubular portion and the valve stem relative to each other and hold the handle on the stem against relative rotation between the tubular portion and stem.

2. A handle adapted for use in association with valve stems of different sizes, said handle having a hand grasping portion and a tubular portion provided with an oversized bore adapted to fit over the end of anyone of said valve stems, and a plurality of screws mounted in circumferentially spaced threaded openings in the wall of the said tubular portion, said screws having pointed ends adapted to engage with the valve stem and the screws being so positioned relative to each other that upon tightening they will substantially center the tubular portion and the valve stem relative to each other with the pointed ends of the screws embedded in the stem to lock the handle on the stem.

3. A handle adapted for use in association with valve stems having portions of different cross-sectional area or shape, said handle having a hand grasping portion and a tubular portion provided with a relatively large bore at its outer end and a relatively small bore at its inner end above the large bore and in communication therewith, the smaller bore being adapted to receive the end of the valve stem, and a plurality of screws mounted in circumferentially spaced threaded openings in the wall of the larger bore, said screws being adapted to engage the valve stem below the end which is contained in the smaller bore and being so positioned relative to each other that upon tightening they will substantially center the tubular portion and valve stem relative to each other and hold the handle on the stem for rotation therewith.

4. A handle adapted for use in association with valve stems of different sizes, said handle having a hand grasping portion and a tubular portion provided with a bore larger than the diameter of and adapted to receive the end of any of said stems, a plurality of screws mounted through circumferentially spaced threaded openings in the wall of the said tubular portion, said screws having pointed ends to engage the valve stem, and said screws being so positioned relative to each other that upon tightening they will position the tubular portion in spaced relation to the stem and the pointed ends thereof will be embedded in the valve stem to secure the handle on the stem against relative rotation and without contact between the inner wall of the tubular portion and the stem.

Signed at New York city in the county of New York and State of New York this 23rd day of March A. D. 1932.

JOHN G. ZOLLEIS.